Jan. 13, 1959        S. K. TAYLOR ET AL        2,868,612
                        RECORDER
Filed March 19, 1954                    3 Sheets-Sheet 1

INVENTORS
KENNETH A. COOL AND
SAMUEL K. TAYLOR
BY Oberlin & Limbach
           ATTORNEYS.

Jan. 13, 1959 S. K. TAYLOR ET AL 2,868,612
RECORDER
Filed March 19, 1954 3 Sheets-Sheet 2
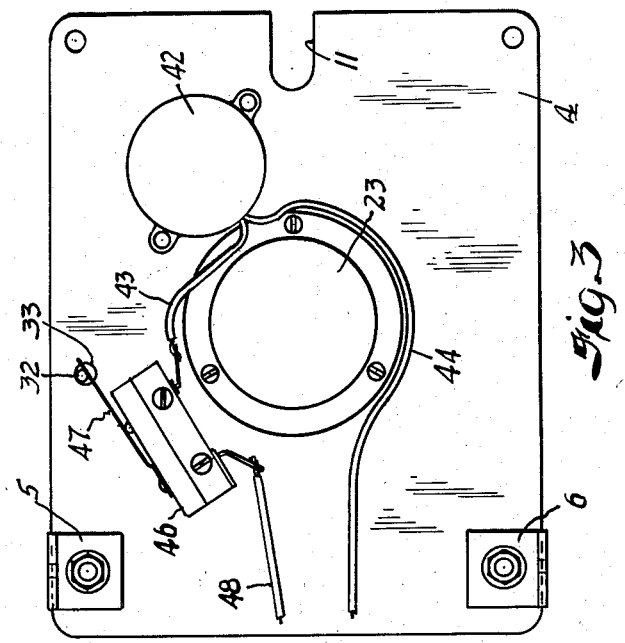
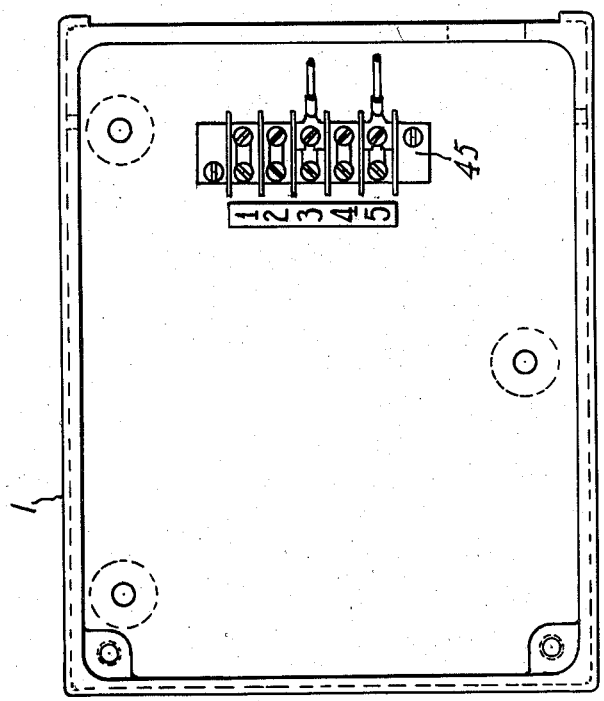
INVENTORS
KENNETH A. COOL +
SAMUEL K. TAYLOR
BY
Oberlin & Limbach
ATTORNEYS.

Jan. 13, 1959 S. K. TAYLOR ET AL 2,868,612
RECORDER
Filed March 19, 1954 3 Sheets-Sheet 3

INVENTORS
KENNETH A. COOL AND
BY SAMUEL K. TAYLOR

Oberlin + Limbach
ATTORNEYS

United States Patent Office 2,868,612
Patented Jan. 13, 1959

2,868,612

RECORDER

Samuel K. Taylor, Cleveland Heights, and Kenneth A. Cool, Shaker Heights, Ohio, assignors to The Service Recorder Company, Cleveland, Ohio, a corporation of Ohio Application March 19, 1954, Serial No. 417,418

7 Claims. (Cl. 346—123)

This invention relates as indicated to a recorder, and more particularly to an electrically operated recorder adapted to record the periods of operation of electrically operated machines and the like.

Because of the large investments by industry in electrically operated machines, it is becoming more and more appreciated that it is important for efficient analysis of operations to know how frequently and for how long such machines are in actual operation. Thus it may be found desirable to revise production schedules and the like in order to secure substantially continuous operation of such machines in order to obtain a satisfactory return on the investment therein. It is apparent that such a recording device may be advantageously employed on a wide range of machines as, for example, arc welders, refrigerators, elevators, etc.

Reference may be had to Cool et al. Patent No. 2,648,591 for a description of an electrically operated recorder which has met with considerable commercial success, such patent illustrating several arrangements whereby such recorder may be connected thus to record the periods of operation of various devices.

Relatively large installations of recorders of this general type are becoming more common and the same may be ranged along the wall of a special control room, for example, not requiring to be located on or adjacent the corresponding machine. It is very desirable that such devices be designed to operate over a considerable time interval and that they present visible dials which are unobstructed by the recording mechanism. It is also important that the time record be precise and accurate and that the device should be easy to service.

It is accordingly a principal object of this invention to provide a recorder which is adapted to indicate the frequency and length of operation of an electrically operated machine or the like.

It is another object to provide a recorder having an unobstructed dial which is visible at all times without the necessity of opening the casing or housing of the device.

A further object is to provide such device having positive drive means effective to produce a very precise and accurate record over an extended period of time, with such drive means being automatically stopped when the limit of the record chart is reached.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is an elevational view of the interior of the main housing with the chart and stylus driving mechanism removed;

Fig. 3 shows the rear side of the panel bearing such chart and stylus driving mechanism normally contained within the housing of Fig. 2;

Figure 1:
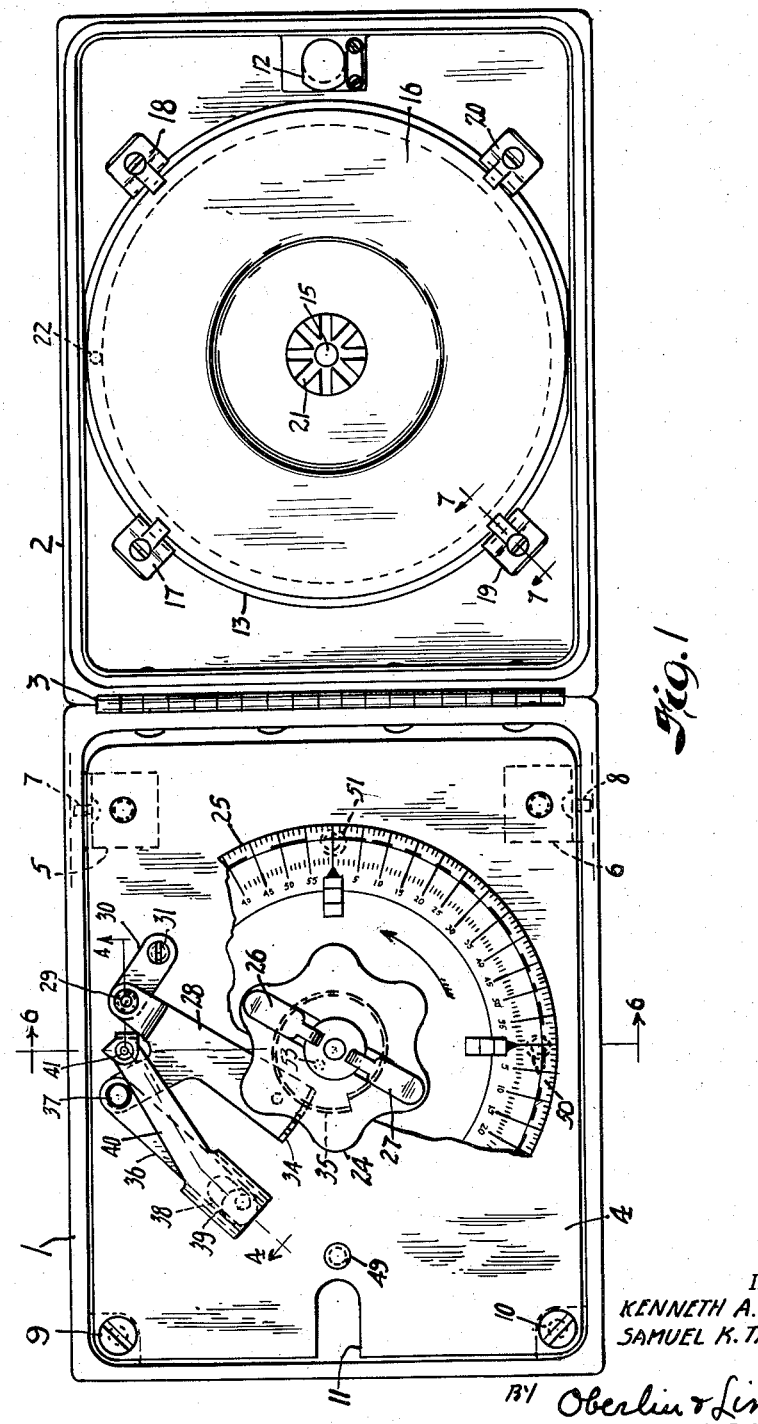
Fig. 1 is an elevational view of our new recorder showing the casing opened so that the inside (or rear side) of the cover is disclosed.

Now referring more particularly to said drawing, the embodiment of our invention there illustrated comprises a main housing 1 with a front cover 2 hingedly connected therewith at 3. A sheet metal panel 4 is pivotally mounted in casing or housing 1 by means of metal bracket 5 and 6 so that it may be swung out of such housing about pivots 7 and 8 when screws 9 and 10 are removed. A notch 11 in such panel is adapted to interengage with latch 12 which may be provided with a key lock to secure front cover 2 in closed position.

Figure 4:
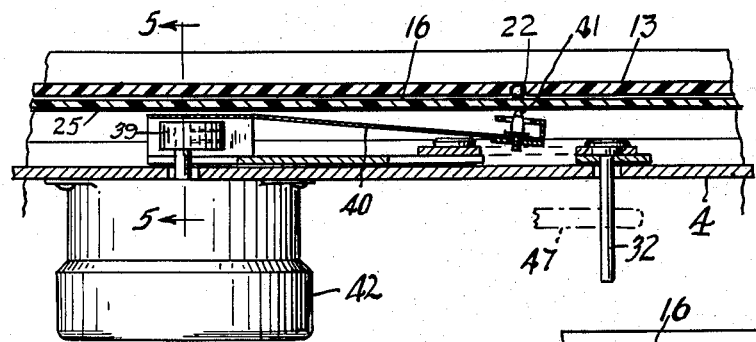
Fig. 4 is a fragmentary transverse section on an enlarged scale taken on the line 4—4 on Fig. 1.
Figure 5:
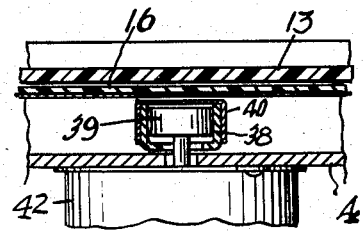
Fig. 5 is a fragmentary section through the stylus drive means taken on the line 5—5 of Fig. 4.
Figure 6:
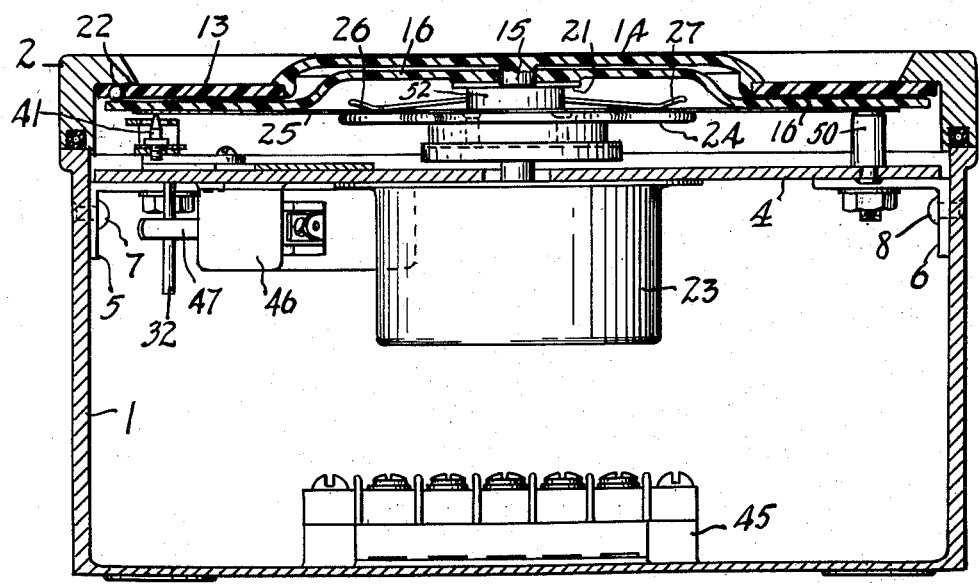
Fig. 6 is a transverse section through the entire assembled recorder taken on the line 6—6 on Fig. 1.
Figure 7:
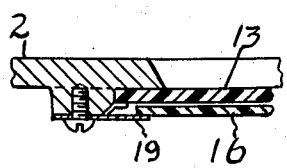
Fig. 7 is a fragmentary section taken on the line 7—7 on Fig. 1.
Figure 8:
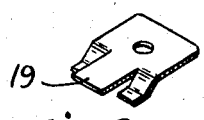
Fig. 8 is a perspective view of one of the clips or retaining elements shown in Figs. 1 and 7.

Such front cover is provided with a circular glass window 13 of substantially the same diameter as that of the chart or record disc employed as described below. Such window may be annular as shown in Fig. 6 with an opaque plastic center member 14 cemented thereto and provided with an inwardly projecting axial stud 15. Freely rotatably mounted on such stud is an inner transparent plastic disc 16 which is held on such stud by means of four sheet metal clips 17, 18, 19 and 20 secured to cover 2 and overlying the outer peripheral margin of the disc. Other portions of such clips serve to retain glass window 13 (see Figs. 7 and 8). The central inner face of plastic disc 16 may be formed with radial grooves 21 to interengage the chart driving means for rotation therewith. Such grooves 21 are not, however, essential inasmuch as mere frictional engagement will ordinarily suffice for this purpose. A small steel ball 22 is mounted within a hollow in glass front 13 (Figs. 1, 4 and 6) to back rotatable disc 16 at this point and locally to support the same against the pressure of the recording stylus.

A manually wound clock 23 is mounted in the rear center of panel 4 axially of stud 15 when the front cover 2 is closed, and is adapted to drive a platform 24 on which record disc 25 is adapted to be releasably retained by means of spring clips 26 and 27 entering a central opening in such record disc. Platform 24 is formed with a scalloped periphery to facilitate use of the same as a winding knob for rewinding clock motor 23.

In the aforesaid Patent 2,648,591 there is shown and described a reciprocating stylus for inscribing a record upon the rotatable record disc, and an adjustable mounting for such stylus. A stylus of this general type is shown and described in Patent No. 1,980,786 of Henry R. Cool whereby the point of pivotal mounting of such stylus may be generally radially adjusted to produce a spiral track upon the record disc and thereby permit several revolutions of the latter. In the present device a Y-shaped sheet metal member 28 is pivotally connected at 29 to the end of a short link 30 in turn pivotally mounted at 31 on panel 4. A rod or pin 32 which may also serve as the hinge pin of pivot 29 projects through an opening 33 in panel 4, such opening being sufficiently wider than the thickness of such pin to permit a degree of shifting of the latter. The lower end of Y-shaped member 28 has an upturned, slightly arcuate lip 34 with notches or serrations therein adapted to engage spiral cam 35 rotatable with platform 24. Accordingly, when the clockwork is wound, this serves to swing Y-shaped member 28 to the left about pivot 29 as viewed in Fig. 1 and consequently to move the stylus generally radially outwardly in the manner described below. Reference may be had to said Patent No. 1,980,786 for further details of such cam mechanism.

Lever 36 is pivotally connected at 37 to the other arm of Y-shaped member 28 and is provided with a slide 38 adapted to fit an eccentric cam 39 so that upon rotation of such cam, lever 36 and stylus arm 40 rigid therewith are rocked about pivot 37. This, of course, causes stylus 41 to reciprocate with a short rapid stroke generally radially of record disc 25. The stylus bearing arm 40 will preferably be in the form of a flat spring shaped to press such stylus firmly against the rear side of record disc 25 with the latter against rotatable plastic disc 16. Ball bearing 22 assists disc 16 in supporting such pressure and facilitates rotation of disc 16 with record sheet 25 despite such pressure of the stylus.

Eccentric cam 39 is driven by a synchronous electric motor 42 having leads 43 and 44. Lead 44 is connected directly to terminal block 45, but lead 43 is connected to a limit switch 46 having an operating lever 47 engaged by pin 32. Lead 48 from such switch connects to terminal block 45 for eventual connection with the device, the operation of which is to be recorded.

Three studs 49, 50 and 51 protrude from the outer surface of panel 4 to support the record sheet or disc 25 in close proximity to the inner face of rotatable plastic disc 16.

The operation of our new recording device may now readily be understood. In the simplest type of installation, the leads 44 and 48 of the synchronous recording motor 42 are merely connected across the line of the electric circuit of the machine, the operation of which is to be recorded. Motor 42 will then run only when the load switch has closed the circuit. A variety of other devices may, of course, be utilized to open and close a switch for actuation of motor 42, and such devices may be actuated mechanically or by fluid pressure, temperature changes, speed changes, photosensitive means, vacuum means and the like. Under some circumstances, it may be desirable to employ a series relay to depress a micro-switch when energized by the load current.

The record disc 25 is mounted on platform 24 and centered by axial boss 52 with the starting point aligned with stylus 29. Clock 23 will already have been wound, thereby shifting such stylus to its radially outermost position relative to the center of chart 25. Such winding of the clock and shifting of the stylus also involves upward movement of rod or finger 32 so that normally closed limit switch 46 will be in closed position to permit energization of motor 42. When the outer cover 2 is now closed and latched, plastic disc 16 (preferably of "Lucite") will press against record disc 25 where the latter is supported by a resiliently mounted stylus 41 and the grooved central portion 21 of disc 16 will also press against boss 52 further to ensure rotation of disc 16 and chart 25 together. As such disc and chart rotate through the action of clock 23, a narrow line is caused to appear on such chart visible through annular glass window 13. The chart 25 may comprise a disc of red paper having the time indicia imprinted thereon and surfaced on its outer face with a thin coating of wax, whitening the same. Where stylus 41 bears against the rear surface of sheet 25, such wax is caused to be displaced to reveal a narrow red line. Chart discs of this type are commercially available but are ordinarily employed with a stylus bearing against the wax coated face of the same directly to displace such wax coating. After a long period of use, a slight amount of wax may be found to adhere to rotatable plastic disc 16, but this may be very easily removed. The line or trace on sheet 25 is thus produced by pressure contact of the stylus 41 therewith, and it will be seen that such contact requires the disc 16 to back or support the sheet in opposition to the stylus, since otherwise the sheet would simply bend or yield under the bearing of the stylus. Accordingly, should the cover 2 be opened during operation of the recorder, the support of the disc 16 is withdrawn and the trace is interrupted; upon reclosing, a gap would appear in the record indicating that the cover had been opened.

Whenever motor 42 is energized in synchronism with corresponding energization of the apparatus or machine being checked, stylus 41 will be rapidly oscillated at a rate sufficient to cause the appearance of a relatively broad band or track on the surface of chart 25 instead of the fine line otherwise appearing. A chart of this nature is very quickly and easily read with no danger of error due to obstruction of the view by overlying mechanism, for example. As platform 24 continues to turn, the stylus is gradually shifted radially inwardly thereof due to the action of spiral cam 35 so that a spiral track is caused to appear on chart 25 by such stylus. It is thus possible for a single record sheet to cover a period of three days, for example, utilizing conventional clockwork and without undue crowding of the record indicia. When the predetermined time interval expires, a small pin or detent 53 projects downwardly from the underside of platform 24 within the area enclosed by spiral cam 35 in position to engage upstanding lip 34 on Y-shaped member 28 when such lip has been shifted sufficiently inwardly toward the axis of such platform. Consequently, when the predetermined time interval has elapsed, such member 28 will be engaged and reciprocated downwardly as viewed in Fig. 1 to cause finger 32 to actuate limit switch 46 and thereby open the circuit to motor 42. As a result, the clock is prevented from further rotation of the record disc and the stylus is de-energized regardless of further operation of the load. Front cover 2 will be opened, the completed chart removed, and the clock rewound. Such rewinding of the clock, of course, releases lever 47 of limit switch 46 so that motor 42 may again be energized and also brings the stylus 41 back to starting position. A new chart is then affixed to platform 24 and the cover 2 closed again for further operation.

It will be seen that we have provided a novel electrically operated recorder wherein the clockwork which drives the record disc also serves simultaneously to shift the stylus to accord a spiral track, and at the end of a predetermined time interval, to shift the stylus mount to actuate a switch opening circuit to the electric motor driving the stylus oscillating mechanism. The record is immediately directly visible as it appears, being viewed through an outer glass window which affords a good dust seal, and also through the rotatably mounted transparent disc 16 against which the record disc is pressed. The device may obviously be very quickly serviced and reset. By employment of the leaf spring stylus arm 40, the stylus is firmly but yieldably pressed against the rear side of the record sheet to ensure the production of a clear, sharp record line. The ball bearing support 22 for disc 16 in the region of such stylus supports disc 16 against the stylus pressure while facilitating rotation of chart and disc together by means of the clockwork drive.

Other modes of applying the principle of the invention may be employed, change being made as regards the details described, provided the features stated in any of the following claims, or the equivalent of such, be employed.

We therefore particularly point out and distinctly claim as our invention:

1. In a recorder, a stylus, a resilient arm to which said stylus is attached, a mounting member for said arm pivotally secured to a stationary support, a pivotal connection between said arm and mounting member, an electric control motor operative when energized to oscillate said arm about such pivotal connection thereof, clock mechanism including a rotatable support for removably mounting a time record disc in front of and in contact with said stylus, a rotatable transparent disc adapted to overlie the front face of said record disc and thus support the same against the pressure exerted by said stylus on the rear face of the record disc, a driving connection between said clock mechanism and transparent disc for rotating the latter in unison with the record disc, cam means interengaging said rotatable support and the stylus arm mounting member operative to shift the pivotal connection of said arm generally radially as the rotatable support is driven by said clock mechanism to produce a spiral track upon said record disc, a detent adapted to engage a stop portion of said mounting member after a predetermined time period of operation and thus shift said mounting member about its pivotal connection with such stationary support therefor, means for connecting said control motor to be energized responsively to operation of the extrinsic device to be recorded, a limit switch in the energization circuit of said motor, and an actuator for said switch operated by such shifting of said mounting member to open the switch and thereby de-energize said motor at the expiration of such predetermined time period of recorder operation, the engagement of said detent and such stop portion of the mounting member and consequent shifting of the latter to the limit of its pivotal movement stopping further rotation of said rotatable support by said clock mechanism.

2. In a recorder, a stylus, a resilient arm to which said stylus is attached, a mounting member for said arm pivotally secured to a stationary support, a pivotal connection between said arm and mounting member, an electric control motor operative when energized to oscillate said arm about such pivotal connection thereof, clock mechanism including a rotatable support for removably mounting a time record disc in front of and in contact with said stylus, a rotatable transparent disc adapted to overlie the front face of said record disc and thus support the same against the pressure exerted by said stylus on the rear face of the record disc, a driving connection between said clock mechanism and transparent disc for rotating the latter in unison with the record disc, means operative to shift the pivotal connection of said arm generally radially as the rotatable support is driven by said clock mechanism to produce a spiral track upon said record disc, means operative to shift said mounting member about its pivotal connection with such stationary support therefor after a predetermined time period of recorder operation, means for connecting such control motor to be energized responsively to operation of the extrinsic device to be recorded, means operative in response to such shifting of said mounting member to de-energize said motor, and means for stopping further rotation of said rotatable support by said clock mechanism likewise in response to such shifting of said mounting member, whereby rotation of such record disc and oscillation of said stylus are automatically terminated at the expiration of such predetermined time period of recorder operation.

3. In a recorder, a stylus, a resilient arm to which said stylus is attached, a mounting member for said arm pivotally secured to a stationary support, a pivotal connection between said arm and mounting member, an electric control motor operative when energized to oscillate said arm about such pivotal connection thereof, clock mechanism including a rotatable support for removably mounting a time record disc in front of and in contact with said stylus, a transparent disc adapted to overlie the front face of said record disc and thus support the same against the pressure exerted on the back thereof by said stylus, means operative to shift the pivotal connection of said arm generally radially as the rotatable support is driven by said clock mechanism to produce a spiral track upon said record disc, means operative to shift said mounting member about its pivotal connection with such stationary support therefor after a predetermined time period of recorder operation, means for connecting said control motor to be energized responsively to operation of the extrinsic device to be recorded, means operative in response to such shifting of said mounting member to de-energize said motor, and means for stopping further rotation of said rotatable support by said clock mechanism likewise in response to such shifting of said mounting member, whereby rotation of such record disc and oscillation of said stylus are automatically terminated at the expiration of such predetermined time period of recorder operation.

4. In a recorder, clockwork drive mechanism including a support adapted removably to mount a time record disc, a stylus adapted to inscribe a record upon such disc, an adjustable mounting for such stylus including a pivotal connection for reciprocation of the stylus generally radially of the disc, an electric control motor operative when energized thus to reciprocate the stylus about its pivotal connection in response to the extrinsic condition to be recorded, cam means for shifting the pivotal connection of said stylus gradually generally radially to produce a spiral track upon the record disc, stop means operative abruptly to shift the adjustable mounting of the stylus when the pivotal connection thereof has been shifted radially a predetermined amount, and switch means operative in response to such abrupt shifting of the stylus mounting to de-energize said control motor.

5. In a recorder, a stylus, a resilient arm to which said stylus is attached, a mounting member for said arm pivotally secured to a stationary support, pivotal connection between said arm and mounting member, an electric control motor operative when energized to oscillate said arm about such pivotal connection thereof, clock mechanism including a rotatable support for removably mounting a time record disc in contact with said stylus, cam means interengaging said rotatable support and the stylus arm mounting member operative to shift the pivotal connection of said arm generally radially as the rotatable support is driven by said clock mechanism to produce a spiral track upon said record disc, a detent adapted to engage a stop portion of said mounting member after a predetermined time period of operation and thus shift said mounting member about its pivotal connection with such stationary support therefor, means for connecting said control motor to be energized responsively to operation of the extrinsic device to be recorded, a limit switch in the energization circuit of said motor, and an actuator for said switch operated by such shifting of said mounting member to open the switch and thereby de-energize said motor at the expiration of such predetermined time period of recorder operation, the engagement of said detent and such stop portion of the mounting member and consequent shifting of the latter to the limit of its pivotal movement stopping further rotation of said rotatable support by said clock mechanism.

6. In a recorder, a casing including an openable cover having a window therein, a transparent disc rotatably mounted on said cover at the inner side thereof, a rotating platform within said casing which engages said disc to rotate the same when the cover is in closed condition, said disc and platform being adapted cooperably to support a thin record sheet therebetween, with the outer surface of such sheet being visible through the disc and window in the cover, and a stylus resiliently mounted in the casing adjacent said platform and projecting forwardly to bear against the inner surface of said disc at a sheet-engaging portion of the latter visible through such window, said stylus therefore being adapted to press against the inner surface of a sheet supported by the disc and platform to produce a trace on the same which can be observed from the outside of the casing.

7. The combination set forth in claim 6 characterized further by the provision of anti-friction means inter-engaged between the cover and transparent disc at the region of the latter generally in opposition to the stylus, said anti-friction means stabilizing the disc and facilitating rotation thereof.

References Cited in the file of this patent

UNITED STATES PATENTS

| | | |
|---|---|---|
| 1,078,138 | Frick | Nov. 11, 1913 |
| 1,533,586 | Desenne | Apr. 14, 1925 |
| 2,216,635 | Tate | Oct. 1, 1940 |
| 2,648,591 | Cool et al. | Aug. 11, 1953 |